Oct. 29, 1963 LE MOYNE E. FARNSWORTH 3,108,715
MACHINE FOR REMOVING AND DELIVERING A PREDETERMINED
NUMBER OF LAMINATIONS OR OTHER
ARTICLES FROM A SUPPLY STACK
Filed Aug. 22, 1961 4 Sheets-Sheet 1
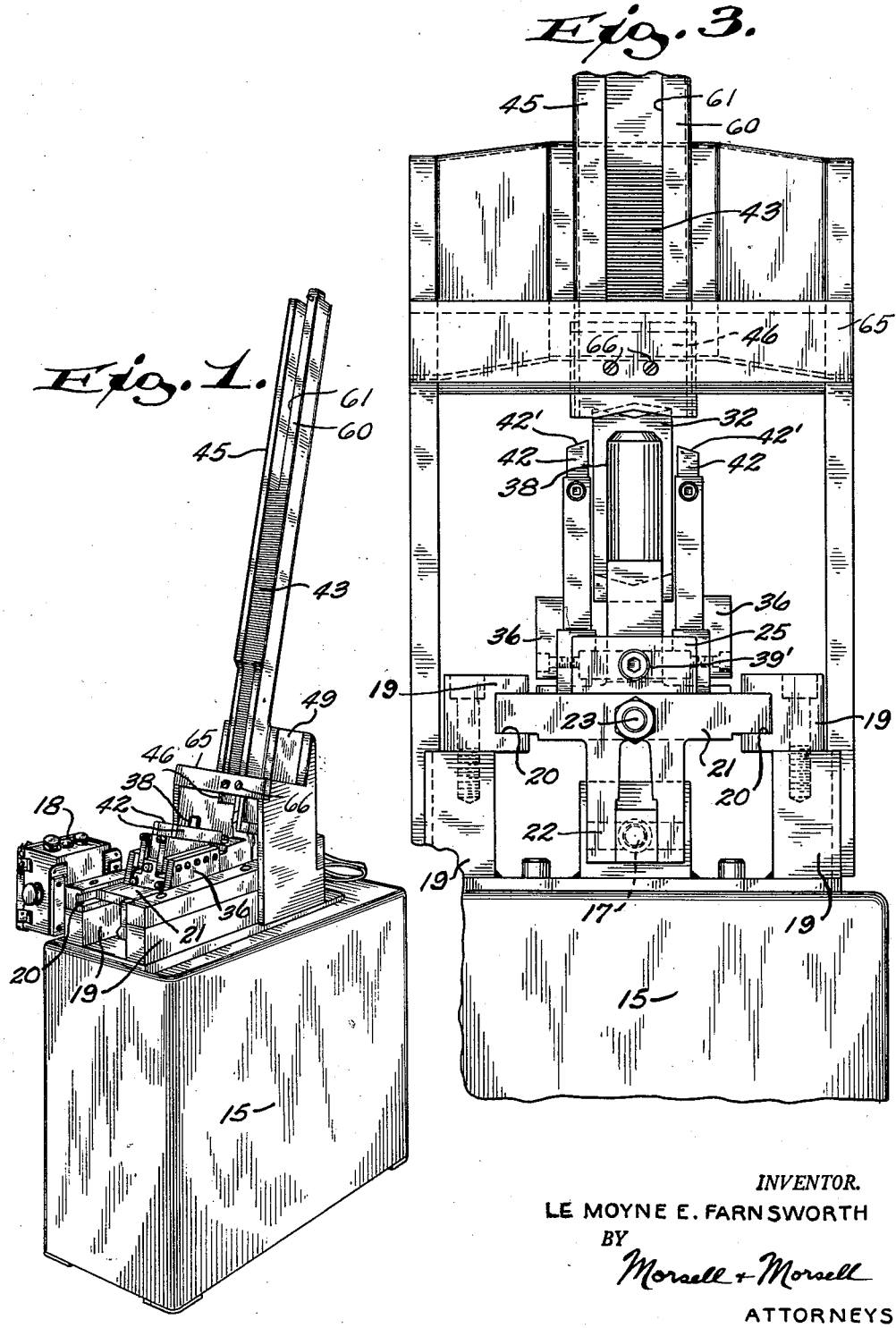
*INVENTOR.*
LE MOYNE E. FARNSWORTH
BY
Morsell + Morsell
ATTORNEYS.

Oct. 29, 1963  LE MOYNE E. FARNSWORTH  3,108,715
MACHINE FOR REMOVING AND DELIVERING A PREDETERMINED
NUMBER OF LAMINATIONS OR OTHER
ARTICLES FROM A SUPPLY STACK
Filed Aug. 22, 1961  4 Sheets-Sheet 2
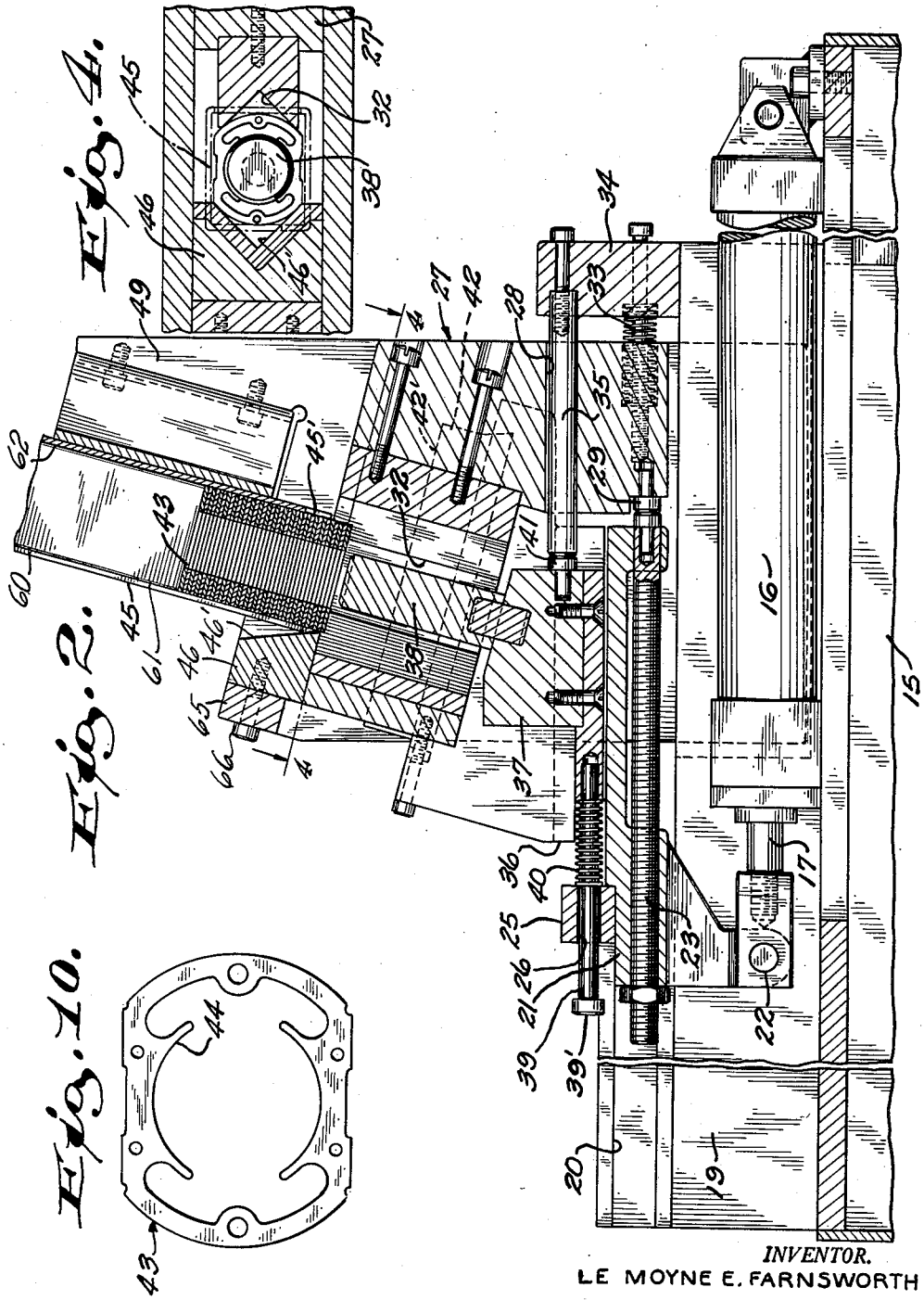
INVENTOR.
LE MOYNE E. FARNSWORTH
BY
Morsell & Morsell
ATTORNEYS.

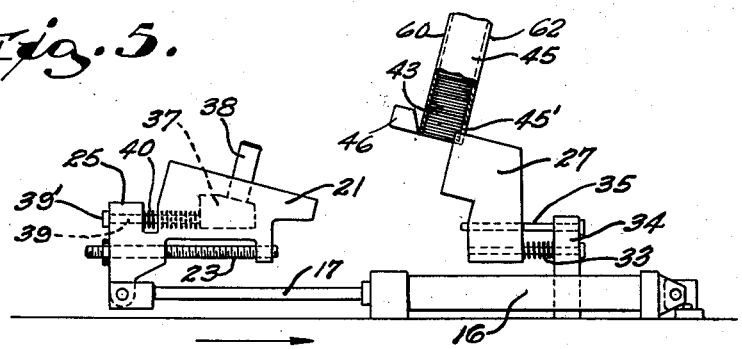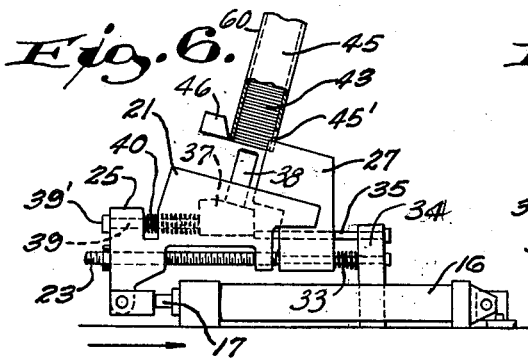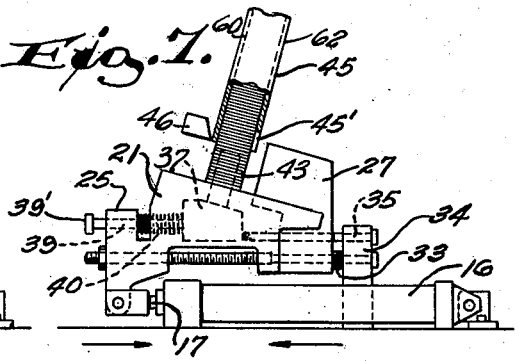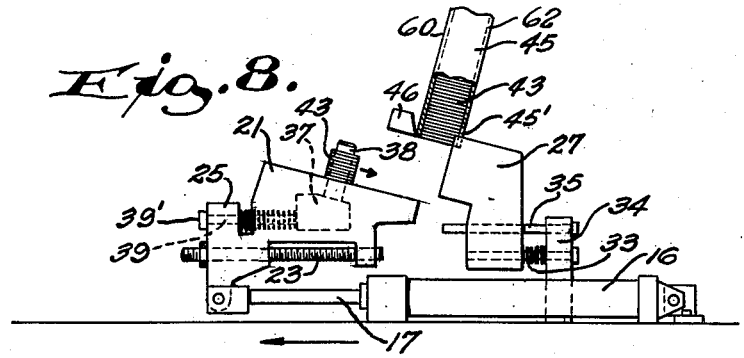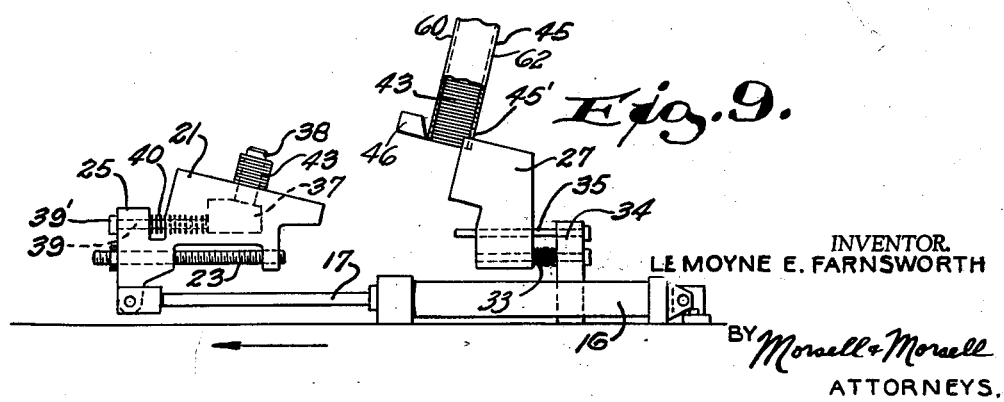

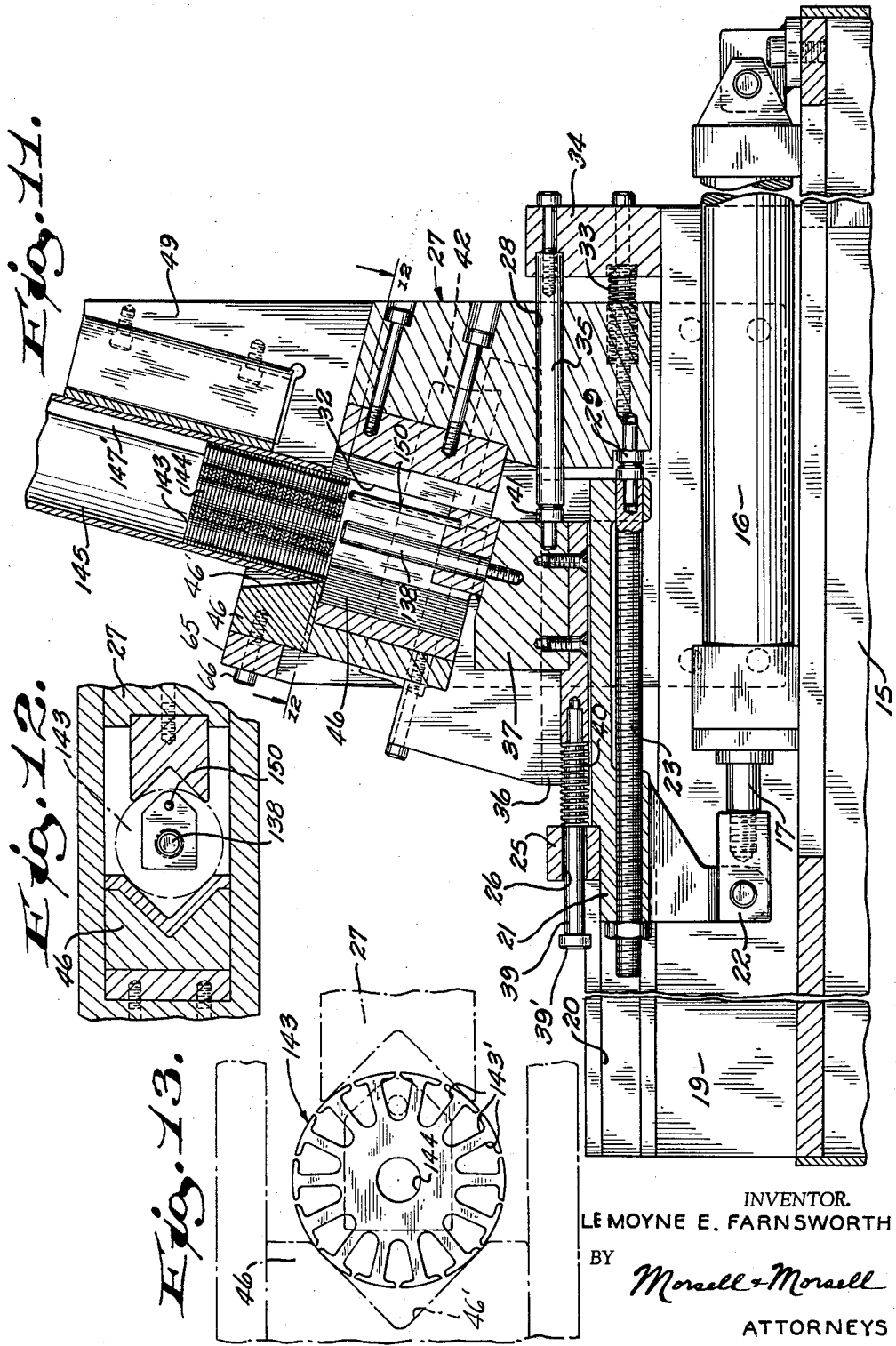

United States Patent Office 3,108,715
Patented Oct. 29, 1963

3,108,715
MACHINE FOR REMOVING AND DELIVERING A PREDETERMINED NUMBER OF LAMINATIONS OR OTHER ARTICLES FROM A SUPPLY STACK
Le Moyne E. Farnsworth, Racine, Wis., assignor to Automation Machines and Equipment Co., Inc., Milwaukee, Wis., a corporation of Wisconsin
Filed Aug. 22, 1961, Ser. No. 133,164
5 Claims. (Cl. 221—213)

This invention relates to an improved machine for removing and delivering a predetermined number of laminations or other articles from a supply stack.

In the manufacture of devices which are formed of a number of aligned flat pieces, or laminations, such as electrical coils, it is desirable that the person assembling the device receive the precise number of laminations required for each coil and in aligned, stacked form, thus eliminating the necessity for his having to manually count, or weigh, and stack such laminations for each coil. With this in mind, the general object of the present invention is to provide a machine which is adapted to automatically remove a predetermined number of laminations from a supply stack, and to deliver the same to the operator in stacked form, ready for assembly.

A further object of the present invention is to provide an improved machine for removing and delivering laminations or other articles from a stack as described, which machine includes novel means for insuring the delivery of the entire stack portion removed, and eliminating the possibility of one or more of the laminations being inadvertently dislodged or separated from the stack delivery.

Still further objects of the present invention are to provide a machine for removing and delivering a predetermined number of laminations or other articles from a stack as described, which machine is relatively inexpensive in design and construction, simple to operate, durable and long lasting, and is otherwise well adapted for its intended purposes.

With the above and other objects in view, the invention consists of the improved machine for removing and delivering laminations or similar articles, and all of its parts and combinations as set forth in the following specification and claims, and all equivalents thereof.

In the accompanying drawings, illustrating the preferred form of the invention and a modification thereof, and wherein like reference numerals designate the same parts in all of the views:

FIG. 1 is a perspective view of the complete machine comprising the present invention;

FIG. 2 is a fragmentary vertical sectional view of the machine;

FIG. 3 is a fragmentary front elevational view;

FIG. 4 is a transverse sectional view, taken along line 4—4 of FIG. 2;

FIG. 5 is a simplified, diagrammatic view illustrating the relative positions of the machine elements at the commencement of its operation;

FIG. 6 is a diagrammatic view during the rearward stroke just prior to the removal of the laminations from the supply stack;

FIG. 7 is a diagrammatic view at the completion of the rearward stroke and at the commencement of the return stroke;

FIG. 8 is a diagrammatic view during the return stroke;

FIG. 9 is a diagrammatic view of the machine at the completion of its operation;

FIG. 10 is a top plan view of the type of lamination for which the principal form of machine is designed;

FIG. 11 is a fragmentary vertical sectional view of a modified form of machine;

FIG. 12 is a fragmentary transverse sectional view taken along line 12—12 of FIG. 11; and FIG. 13 is a top plan view of the type of lamination for which the machine of FIGS. 11 and 12 is designed.

Referring now more particularly to the drawings, it will be seen that the improved machine comprising the present invention is mounted on a base 15 having a rectangular top surface with a pair of parallel, upright wall members 19 thereon and extending substantially its entire length. A pneumatic cylinder 16 and double acting ram 17 (FIG. 2) is mounted between said wall members and is suitably connected to a source of compressed air. Said pneumatic ram is designed to actuate the novel stack-removing mechanism comprising the present invention, as will be hereinafter described, and on the forward end of the base is a control box 18 housing electrical controls for said ram. It is to be understood, of course, that while a pneumatic cylinder and ram have been illustrated and described, any comparable hydraulic or other actuating mechanism may be employed, and the invention is not to be limited in this respect.

As shown in FIG. 3, there is a longitudinal groove 20 in the inner surface of each of the wall members 19 adjacent the upper edge thereof, and mounted in said grooves and longitudinally slidably carried by and between said wall members is a member 21, hereinafter called the "carriage," the forward end of which is connected as at 22 to said pneumatic ram 17. A longitudinally adjustable rod 23 (FIG. 2) extends through said carriage, projecting rearwardly a short distance therebeyond, and rigidly mounted on the upper surface of said carriage adjacent the forward end thereof is a block 25 having a horizontal bore 26 therethrough.

Slidably carried by and between the walls 19 in alignment with and to the rear of said carriage 21, is a member 27, hereinafter called the "retaining member," there being a longitudinal bore 28 therethrough positioned above said carriage (FIG. 2), a forwardly-projecting stud 29 in alignment with said rearwardly-projecting carriage rod 23, and projecting rearwardly from said retaining member is a compression spring 33. The upper portion of said member 27 is provided with a front face 32 which is angled upwardly and rearwardly and as is illustrated in FIG. 4 said front face is V-shaped in horizontal cross section, the particular design of which face 32 is an important feature of the present machine, as will be seen.

As is best shown in FIG. 2, to the rear of the slidable retaining member 27 is an abutment block 34 which is rigidly fixed to the top surface of the base, said abutment block having an elongated rod 35 projecting forwardly therefrom and completely through the longitudinal bore 28 in said retaining member.

With reference now to FIGS. 1 and 3, it will be seen that a pair of spaced, upright side elements 36 are formed integrally on the upper surface of the carriage 21, there being an inverted T-shaped space therebetween, and slidably carried by and between said carriage side elements is an inverted T-shaped block member 37. A cylindrical spindle 38 (FIGS. 2, 3, and 4) is rigidly mounted on said member 37, projecting upwardly and rearwardly therefrom at an angle from the true vertical, and secured to and extending forwardly from said slidable spindle block, and projecting through the aforementioned upright block 25 on the forward end of the carriage, is an elongated rod 39 having an enlarged head 39' at its forward end. A compression spring 40 surrounds said rod 39 between said spindle block and said carriage block 25, and extending rearwardly from said spindle block in alignment with the forward end of the aforementioned abutment block rod 35 is a stud 41. As illustrated in FIG. 2, the carriage side elements 36 project upwardly above the top surface of the spindle block, and the upper edges of said side elements are angled rearwardly and downwardly, which is an important feature of the invention as will be seen. In the preferred form of the invention a pair of rectangular extension members 42 (FIG. 1) are removably mounted on said carriage side elements, said extension members being similarly inclined rearwardly and downwardly, and, in addition, the upper surfaces 42' thereof are angled laterally downwardly and outwardly (FIG. 3).

The articles or laminations 43 for which the machine comprising the present invention is designed are ordinarily of the type illustrated in FIG. 10, being generally rectangular in form and having a relatively large central aperture 44 therethrough, said articles being intended for use in the manufacture of electrical coils or similar devices formed of multiple laminations. It is to be understood, however, that the particular design or configuration of the laminations is not critical to the present invention, it being necessary only that said laminations have a transverse aperture therethrough, as will be seen.

The lamination container or magazine 45 is supported above the machine base by a member 49 and projects upwardly and rearwardly at the same angle from the vertical as the spindle 38. Said magazine is of a size and cross sectional contour to slidably retain said laminations or other articles in aligned, stacked form and is preferably of a sufficient height to accommodate a substantial number of such laminations. The magazine front wall 60 is provided with a slotted opening 61 which extends the entire length of said magazine, and the rear wall 62 of said magazine is provided with a slotted opening 45' which extends upwardly a short distance from the bottom thereof, and adjustably mounted at the lower end of said front wall is a block 46 (FIGS. 2 and 4) which has an inclined, V-shaped rear face 46' projecting through said front wall opening and into the magazine interior. Said block 46 is mounted on a bar 65 which spans the sides of the aforementioned supporting member 49 on the machine base, being secured to said bar by screws 66, and is positioned slightly above the upper end of the spindle 38. The forwardly and downwardly angled front face 32 of the aforementioned retaining member 27 is also V-shaped in horizontal cross section, as described, and said member 27 is ordinarily positioned adjacent the magazine with the lower portion of said angled face 32 projecting forwardly through said rear wall opening and into the magazine interior. Thus the laminations 43 are held in the magazine through the coaction of said inwardly-projecting members 27 and 46, the lowermost laminations in the magazine being pressurably clamped between said members and the stack thereabove being supported in the magazine by said lowermost laminations.

In the operation of the novel machine comprising the present invention, as is illustrated diagrammatically in FIGS. 5 through 9, when the pneumatic ram 17 is actuated, through the electrical controls in the control box 18, the carriage 21 is pulled rearwardly thereby from its normal position shown in FIG. 5, the spindle supporting block 37 being pushed rearwardly also (FIG. 6) by the semi-rigid spring 40. When said spindle block reaches the point where it abuts the end of the rod 35 projecting forwardly from the rigid stop-block 23 (FIG. 6) said spindle block is stopped, said rod 35 being of such a length that when the spindle block is stopped the spindle 38 thereon is positioned immediately beneath the lamination-containing magazine 45.

After the rearward travel of the spindle block 37 has been stopped as described, the carriage 21 continues moving rearwardly with the pneumatic ram, the spring 40 between the spindle block and the carriage projection 25 being compressed thereby and maintaining said spindle block pressurably clamped against the rod 35 and in aligned position beneath the magazine. Simultaneously, the rearwardly-moving carriage 21 engages the slidable retaining member 27 and the latter is pushed rearwardly thereby and out of supporting engagement with the lowermost laminations 43 in the magazine, thus permitting said laminations to fall downwardly onto and encircling the spindle 38 therebelow (FIG. 7), said laminations coming to rest on the downwardly and rearwardly angled top surface of the carriage side elements. The number of laminations dropping onto the spindle is determined, of course, by the distance between the upper surface of said carriage side elements and the bottom of the magazine. In the preferred form of the invention, and as illustrated in FIG. 2, the carriage side elements are provided with removable extension members 42, as hereinabove described, and said extension members can be readily removed and replaced to vary that distance, and consequently the number of laminations deposited on the spindle, depending on the requirements of the particular coil or other article being assembled.

The slidable retaining member 27 then continues rearwardly with the carriage until it strikes the rigid abutment block 34 at the rear end of the base, the spring 33 being simultaneously compressed therebetween, and at that point (FIG. 7) the pneumatic pump reverses and the double-acting ram begins to draw the carriage forwardly. The retaining member 27 moves forwardly also, being actuated by the previously-compressed spring 33, and is returned to its initial position where its forward face 32 projects through the opening 45' in the magazine rear wall and again pressurably maintains the laminations in the magazine. When the carriage 21 reaches the point on its forward travel where the upright projection 25 on its forward end engages the rod head 39' (FIG. 8), the spindle block 37 is drawn forwardly with said carriage, thus delivering the laminations on the spindle to the forward end of the base (FIG. 9), where they can be easily removed by the operator.

Due to the rearwardly and downwardly angled nature of the carriage side elements 36, and the extension members 42 thereon, when the carriage moves forwardly on the return stroke of the ram, and before the spindle block 37 commences its forward travel, the laminations encircling the spindle are caused to ride downwardly on said angled side elements, thus dropping further onto the spindle (FIGS. 8 and 9) and insuring that the uppermost laminations thereon cannot be disengaged from or knocked off of the top of the spindle during their forward travel. This is a unique and important feature of the present structure. In addition, because the upper surfaces 42' of said side element extensions 42 are also transversely angled (FIG. 3) the laminations deposited thereon are supported only by the inner edges of said extension members, thus minimizing the surface contact therebetween and reducing the possibility of a bent or deformed lamination being improperly seated on said extension members.

After the carriage 21 and spindle block 37 reach the forward end of the base the action of the pneumatic ram is automatically ceased and the operator merely removes the stack of laminations from the spindle, said stack containing exactly the right number of laminations for the particular coil or other article being assembled, as previously determined and fixed through the setting of the extension members 42 relative to the bottom of the magazine 45, as described.

In FIG. 13 it will be noted that a slightly different type of lamination 143 is illustrated, having a plurality of peripheral serrations 143' in addiiton to a central aperture 144. For this type of lamination the magazine 145 on the machine (FIG. 11) is provided with a longitudinal rib 147' which projects into one of the peripheral serrations in said laminations, to hold the latter in alignment, and in order to insure that the laminations are delivered to the operator in the same form, the modified machine structure is provided with a double spindle arrangement as shown in FIG. 11. With such an arrangement the central spindle 138 is adapted to project through the lamination central aperture 144, as in the principal form of the invention, and, in addition, the smaller adjacent spindle 150 is positioned to extend upwardly through one of the edge serrations 143' as the laminations fall from the magazine, thus holding said laminations in a position where the edge serrations are in registration and the entire stack is in perfect alignment.

From the foregoing detailed description it will be seen that the present invention provides a unique machine for removing and delivering a predetermined number of laminations from a supply stack, thus permitting their quick and easy assembly and eliminating the necessity for the workman to tediously count and manually stack such laminations for each coil or other article being assembled.

It is to be understood, of course, that various changes and modifications in the structure illustrated and hereinabove described will undoubtedly occur to those skilled in the art, and all of such changes or modifications are contemplated as may come within the scope of the following claims.

What I claim is:

1. A machine for removing a predetermined plurality of apertured laminations simultaneously from a supply stack, comprising: a horizontal base having a forward and a rearward end; an upright, lamination-containing magazine positioned above said base and housing a plurality of apertured laminations in aligned, stacked form, said magazine having an open lower end; a carriage longitudinally movably mounted on said base; power-actuated means on said base adapted to move said carriage rearwardly and forwardly under said magazine; an upright spindle movable with said carriage and positionable immediately beneath the lower end of said lamination-containnig magazine; a lamination-support member movably mounted on said base and normally positioned to support the stack of laminations within said open-ended magazine, said lamination support member being movable by said carriage, after said upright spindle is positioned beneath the magazine, to a position where said laminations are free to fall from the open lower end of said magazine and onto the spindle therebelow; and means on said base adapted to return said lamination support member to its lamination-supporting position after predetermined plurality of laminations have been deposited on said spindle.

2. A machine for removing apertured laminations from a supply stack, comprising: a horizontal base having a forward and a rearward end; an upright, lamination-containing magazine positioned above said base intermediate its length and housing a plurality of apertured laminations in aligned, stacked form, said magazine having an open lower end; a carriage longitudinally movably mounted on said base and having a pair of spaced, parallel side elements projecting upwardly therefrom, power-actuated means on said base adapted to move said carriage longitudinally thereon from the forward to the rearward end of said base and back again to a forward position; an upright spindle movable with said carriage and independently movably carried by and between said carriage side elements; means on the base adapted to stop said spindle immediately beneath the lower end of said lamination-containing magazine during the rearward travel of said carriage; a lamination-support member movably mounted on said base and normally positioned to support the stack of laminations within said open-ended magazine, said lamination support member being movable by said carriage during the rearward travel of the latter, after the upright spindle is positioned beneath the magazine, to a position where said laminations are free to fall from the open lower end of said magazine and onto the spindle therebelow and to rest on said carriage side elements; means on said base adapted to return said lamination support member to its lamination-supporting position as the carriage commences its forward travel; and means on said carriage adapted to engage said spindle and carry the same forwardly therewith after said lamination-supporting member has been returned to its lamination-supporting position.

3. A machine for removing a predetermined number of apertured laminations from a supply stack, comprising: a horizontal base having a forward and a rearward end; an upright, lamination-containing magazine positioned above said base intermediate its length and housing a plurality of apertured laminations in aligned, stacked form, said magazine having an open lower end; a carriage longitudinally movably mounted on said base and normally positioned forwardly of said magazine, said carriage being provided with a pair of spaced, parallel side elements projecting upwardly therefrom and having downwardly and rearwardly angled top surfaces; power-actuated means on said base adapted to move said carriage longitudinally thereon from its normal, forward position to the rear of the base, and forwardly again to its original position; an upright spindle movable with said carriage and independently movably carried by and between said carriage side elements; means on the base adapted to stop said spindle immediately beneath the lower end of said lamination-containing magazine during the rearward travel of said carriage; a lamination-support member movably mounted on said base and normally positioned to support the stack of laminations within said open-ended magazine, said lamination support member being movable by said carriage during the rearward travel of the latter, after the upright spindle is positioned beneath the magazine, to a position where said laminations are free to fall from the open lower end of said magazine and onto the spindle therebelow and to rest on the rearwardly angled top surface of the carriage side elements; means on said base adapted to return said lamination support member to its lamination-supporting position as the carriage commences its forward travel; and means on said carriage adapted to engage said spindle and carry the same forwardly therewith after said lamination-supporting member has been returned to its lamination-supporting position, the forward travel of said carriage prior to its engagement with said spindle causing the laminations encircling said spindle to ride downwardly on the angled carriage side elements and thus drop to a lower position on the spindle prior to the commencement of their forward travel.

4. A machine for removing a predetermined number of apertured laminations from a supply stack, comprising: a horizontal base having a forward and a rearward end; an upright, lamination-containing magazine positioned above said base intermediate its length and housing a plurality of apertured laminations in aligned, stacked form, said magazine having an open lower end; an elongated carriage longitudinally movably mounted on said base and normally positioned forwardly of said magazine, said carriage being movable rearwardly and under said magazine, and said carriage having a pair of spaced, parallel side elements projecting upwardly therefrom and extending substantially its entire length, the upper surfaces of said carriage side elements being angled downwardly and rearwardly; power-actuated means on said base adapted to move said carriage longitudinally thereon from its normal, forward position to the rear of the base, and forwardly again to its original position; an upright spindle movable with said carriage and independently movably carried by and between said carriage side elements; means on the base adapted to stop said spindle immediately beneath the lower end of said lamination-containing magazine during the rearward travel of said carriage; a lamination-support member longitudinally movably mounted on said base rearwardly of and normally spaced from said carriage, said lamination-support member having an upper portion with means thereon normally positioned to support the stack of laminations within said open-ended magazine, said lamination support member being engageable by said carriage during the rearward travel of the latter after the upright spindle is positioned beneath the magazine, said lamination support member being movable rearwardly by said carriage from its normal stack-supporting position to a retracted position where said laminations are free to fall from the open lower end of said magazine and onto the spindle therebelow and to rest on the rearwardly angled top surface of the carriage side elements; spring means on said base adapted to return said lamination support member to its forward, lamination-supporting position as the carriage commences its forward travel; and means on said carriage adapted to engage said spindle and carry the same forwardly therewith after said lamination-supporting member has been returned to its forward position, the forward travel of said carriage prior to its engagement with said spindle causing the laminations encircling said spindle to ride downwardly on the angled carriage side elements and thus drop to a lower position on the spindle prior to the commencement of their forward travel with said spindle and carriage.

5. A machine for moving apertured laminations from a supply stack, comprising: a horizontal base having a forward and a rearward end; an upright, lamination-containing magazine positioned above said base and housing a plurality of apertured laminations in aligned, stacked form, said magazine having an open lower end; a carriage longitudinally movably mounted on said base and having a pair of spaced elements projecting upwardly therefrom, means on said base adapted to move said carriage forwardly and rearwardly thereon; an upright spindle movable with said carriage and independently movably carried between said spaced, upwardly-projecting carriage elements; means on the base adapted to stop said spindle immediately beneath the lower end of said lamination-containing magazine during the rearward travel of said carriage; a lamination-support member movably mounted on said base and normally positioned to support the stack of laminations within said open-ended magazine, said lamination support member being movable by said carriage during the rearward travel of the latter, after the upright spindle is positioned beneath the magazine, to a position where said laminations are free to fall from the open lower end of said magazine and onto the spindle therebelow and to rest on the spaced, upwardly-projecting elements on said carriage; and means on said base adapted to return said lamination support member to its lamination-supporting position after a predetermined number of lamainations have fallen onto said spindle.

References Cited in the file of this patent
UNITED STATES PATENTS

| | | |
|---|---|---|
| 972,649 | Rose | Oct. 11, 1910 |
| 1,497,697 | Rice | June 17, 1924 |
| 1,990,267 | Clarkson | Feb. 5, 1935 |
| 2,291,187 | Johnson | July 28, 1942 |
| 2,639,045 | Wahl | May 19, 1953 |